(12) United States Patent
Patrick et al.

(10) Patent No.: US 9,927,798 B2
(45) Date of Patent: *Mar. 27, 2018

(54) MOBILE CONNECTIVITY AND CONTROL OF SEMICONDUCTOR MANUFACTURING EQUIPMENT

(71) Applicant: Lam Research Corporation, Fremont, CA (US)

(72) Inventors: Roger Patrick, Mountain View, CA (US); Chung Ho Huang, San Jose, CA (US); Simon Gosselin, Menlo Park, CA (US); Vincent Wong, Pleasanton, CA (US); Ronald Ramnarine, Fremont, CA (US); Neal K. Newton, San Jose, CA (US); Mukesh Shah, Fremont, CA (US); Kerwin Hoversten, San Ramon, CA (US); Robert Ahrens, San Jose, CA (US); Marco Mora, San Jose, CA (US)

(73) Assignee: LAM RESEARCH CORPORATION, Fremont, CA (US)

( * ) Notice: Subject to any disclaimer, the term of this patent is extended or adjusted under 35 U.S.C. 154(b) by 306 days.

This patent is subject to a terminal disclaimer.

(21) Appl. No.: 14/876,213

(22) Filed: Oct. 6, 2015

(65) Prior Publication Data

US 2016/0103445 A1    Apr. 14, 2016

Related U.S. Application Data

(60) Provisional application No. 62/062,763, filed on Oct. 10, 2014.

(51) Int. Cl.
*G06F 19/00* (2018.01)
*G05B 19/4065* (2006.01)

(52) U.S. Cl.
CPC ............ *G05B 19/4065* (2013.01); *G05B 2219/31202* (2013.01); *G05B 2219/45031* (2013.01); *G05B 2219/50185* (2013.01)

(58) Field of Classification Search
CPC .................................................. G05B 19/4065
(Continued)

(56) References Cited

U.S. PATENT DOCUMENTS 5,923,553 A * 7/1999 Yi ................... G05B 19/41875
700/110
6,317,750 B1 * 11/2001 Tortolani .............. G06F 17/246
(Continued)

FOREIGN PATENT DOCUMENTS

EM    0020843010028    11/2012
EM    0013536010046    2/2013
(Continued)

OTHER PUBLICATIONS

Yao, Xiaodong, et al. "Optimal preventive maintenance scheduling in semiconductor manufacturing." IEEE Transactions on Semiconductor Manufacturing 17.3 (2004): pp. 345-356.*
(Continued)

*Primary Examiner* — Satish Rampuria
(74) *Attorney, Agent, or Firm* — Weaver Austin Villeneuve & Sampson LLP

(57) ABSTRACT

Integration of semiconductor tool maintenance operations on mobile devices to allow technicians to more accurately perform semiconductor tool maintenance and to allow more accurate analysis of data to improve maintenance procedures to be more repeatable, consistent, and efficient. Remote control of maintenance operations for the semiconductor tool via a portable electronic device decreases the time required to service semiconductor tools and thus increase throughput.

18 Claims, 9 Drawing Sheets

(58) Field of Classification Search
USPC .................................................. 700/108–129
See application file for complete search history.

(56) References Cited

U.S. PATENT DOCUMENTS

| | | | |
|---|---|---|---|
| 7,120,511 | B1 | 10/2006 | Tanzer et al. |
| D548,242 | S | 8/2007 | Viegers |
| D570,857 | S | 6/2008 | Nguyen et al. |
| D570,858 | S | 6/2008 | Loehr et al. |
| D578,132 | S | 10/2008 | Lee |
| D589,527 | S | 3/2009 | Shamma |
| D593,114 | S | 5/2009 | Vakkalanka |
| D594,019 | S | 6/2009 | Ball |
| D622,730 | S | 8/2010 | Krum |
| D625,315 | S | 10/2010 | Jewitt et al. |
| D625,316 | S | 10/2010 | Jewitt et al. |
| D625,317 | S | 10/2010 | Jewitt et al. |
| D634,749 | S | 3/2011 | Brown |
| D636,779 | S | 4/2011 | Boush et al. |
| D656,944 | S | 4/2012 | Lee et al. |
| D658,667 | S | 5/2012 | Cho et al. |
| 8,209,223 | B2 | 6/2012 | Fink |
| 8,239,359 | B2 | 8/2012 | Barsook |
| D667,835 | S | 9/2012 | Chaudri |
| D669,090 | S | 10/2012 | Rosen |
| 8,302,020 | B2 | 10/2012 | Louch |
| D673,165 | S | 12/2012 | Ospina Gonzalez |
| D678,309 | S | 3/2013 | Kobayashi |
| D684,160 | S | 6/2013 | Truelove |
| D684,161 | S | 6/2013 | Truelove |
| D684,164 | S | 6/2013 | Friedlander |
| D684,177 | S | 6/2013 | Winther et al. |
| D685,811 | S | 7/2013 | Shia et al. |
| D685,812 | S | 7/2013 | Bork et al. |
| D685,815 | S | 7/2013 | Bork et al. |
| D687,458 | S | 8/2013 | Philopoulos |
| D687,850 | S | 8/2013 | Rhee et al. |
| D688,258 | S | 8/2013 | Rhee et al. |
| D688,259 | S | 8/2013 | Pearcy et al. |
| D688,682 | S | 8/2013 | Talbot et al. |
| D688,684 | S | 8/2013 | Rhee et al. |
| D688,685 | S | 8/2013 | Rhee et al. |
| D689,086 | S | 9/2013 | Philopoulos |
| D690,312 | S | 9/2013 | Cherian et al. |
| D691,160 | S | 10/2013 | Schupp et al. |
| D693,361 | S | 11/2013 | Arnold et al. |
| D696,684 | S | 12/2013 | Yuk et al. |
| D696,688 | S | 12/2013 | Yuk et al. |
| D700,194 | S | 2/2014 | Kim et al. |
| 8,667,540 | B2 | 3/2014 | Hoshall |
| 8,875,126 | B1 | 10/2014 | Feeser et al. |
| D719,968 | S | 12/2014 | Ebtekar et al. |
| 9,032,296 | B1 | 5/2015 | Jeffs et al. |
| D732,563 | S | 6/2015 | Kitch et al. |
| D732,564 | S | 6/2015 | Kitch et al. |
| D733,738 | S | 7/2015 | Omiya |
| D734,353 | S | 7/2015 | Soojun et al. |
| D735,222 | S | 7/2015 | Ebtekar et al. |
| D737,840 | S | 9/2015 | Omiya |
| 9,129,087 | B2 | 9/2015 | Grab et al. |
| D741,351 | S | 10/2015 | Kito et al. |
| D742,908 | S | 11/2015 | Lee et al. |
| D751,592 | S | 3/2016 | Link |
| 9,311,053 | B2 | 4/2016 | Baughman |
| D757,060 | S | 5/2016 | Lee |
| D757,077 | S | 5/2016 | Blank et al. |
| D760,756 | S | 7/2016 | Koeten et al. |
| D762,232 | S | 7/2016 | Howard et al. |
| D762,234 | S | 7/2016 | Li et al. |
| D788,134 | S | 5/2017 | Wong et al. |
| 2002/0183880 | A1* | 12/2002 | Arima ............... G03F 7/70525 |
| | | | 700/108 |
| 2003/0231213 | A1* | 12/2003 | Gould ............... G06F 3/04815 |
| | | | 715/782 |
| 2005/0004780 | A1* | 1/2005 | Lin ................... G05B 19/4184 |
| | | | 702/184 |
| 2006/0259198 | A1 | 11/2006 | Brcka et al. |
| 2007/0157124 | A1 | 7/2007 | Haug |
| 2007/0211058 | A1 | 9/2007 | Iguchi |
| 2007/0255444 | A1 | 11/2007 | Kauffman et al. |
| 2007/0282781 | A1 | 12/2007 | Mathiesen et al. |
| 2008/0098333 | A1 | 4/2008 | Champion |
| 2008/0184117 | A1 | 7/2008 | Alsbury |
| 2009/0228408 | A1 | 9/2009 | Kaushal et al. |
| 2010/0153848 | A1 | 6/2010 | Saha |
| 2012/0036552 | A1 | 2/2012 | Dare |
| 2012/0239317 | A1 | 9/2012 | Lin |
| 2013/0061267 | A1 | 3/2013 | Cansino |
| 2013/0100475 | A1 | 4/2013 | Kuroyanagi |
| 2013/0104042 | A1 | 4/2013 | Meaney et al. |
| 2013/0174223 | A1 | 7/2013 | Dykeman et al. |
| 2014/0033256 | A1 | 1/2014 | Cox |
| 2014/0115470 | A1 | 4/2014 | Meaney et al. |
| 2014/0115471 | A1 | 4/2014 | Demkin et al. |
| 2014/0173517 | A1 | 6/2014 | Chaudhri |
| 2016/0104128 | A1 | 4/2016 | Gosselin et al. |

FOREIGN PATENT DOCUMENTS

| | | |
|---|---|---|
| JP | 2005-527986 | 9/2005 |
| WO | 2016/057551 | 4/2016 |
| WO | 2016/057565 | 4/2016 |

OTHER PUBLICATIONS

Yung-Cheng, Jonathan Chang, and Fan-Tien Cheng. "Application development of virtual metrology in semiconductor industry." Industrial Electronics Society, 2005. IECON 2005. 31st Annual Conference of IEEE. IEEE, 2005. pp. 124-129.*

Ramirez-Hernández, José A., et al. "Optimal preventive maintenance scheduling in semiconductor manufacturing systems: Software tool and simulation case studies." IEEE Transactions on Semiconductor Manufacturing 23.3 (2010): pp. 477-489.*

U.S. Appl. No. 14/876,203, "Mobile device user interface for supporting service maintenance and tracking activities in semiconductor tool," Simon Gosselin et al., filed Oct. 6, 2015.

U.S. Appl. No. 29/504,989, "Mobile device graphical user interface design for supporting service maintenance and tracking activities in semiconductor tool," Vincent Wong et al., filed Oct. 10, 2014.

U.S. Appl. No. 29/504,990, "Mobile device graphical user interface design for supporting service maintenance and tracking activities in semiconductor tool," Vincent Wong et al., filed Oct. 10, 2014.

TW patent application No. 104301852, Office Action dated Nov. 13, 2015.

TW patent application No. 104301861, Office Action dated Jan. 21, 2016.

KR patent application No. 30-2015-0018420, Office Action dated Nov. 12, 2015.

KR patent application No. 30-2015-0018445, Office Action dated Nov. 12, 2015.

WO patent application No. PCT/US2015/054306, International Search Report and Written Opinion dated Mar. 18, 2016.

WO patent application No. PCT/US2015/054290, International Search Report and Written Opinion dated Mar. 18, 2016.

KR patent application No. 30-2015-0018420, Decision of Grant of Design dated Mar. 2, 2016.

KR patent application No. 30-2015-0018445, Decision of Grant of Design dated Mar. 2, 2016.

TW patent application No. 104301852, Notice of Allowance dated Apr. 15, 2016.

TW patent application No. 105300569, Notice of Allowance dated Apr. 15, 2016.

TW patent application No. 104301861, Notice of Allowance dated May 26, 2016.

U.S. Appl. No. 29/504,989, Office Action dated Dec. 30, 2016.

U.S. Appl. No. 29/504,990, Office Action dated Oct. 6, 2016.

U.S. Notice of Allowance dated Mar. 28, 2017 issued in Design U.S. Appl. No. 29/504,990.

Taiwan Notice of Allowance and Search Report dated Jun. 16, 2016 issued in application No. TW 105301175.

(56) References Cited

OTHER PUBLICATIONS

PCT International Preliminary Report on Patentability and Written Opinion dated Apr. 20, 2017 issued in PCT/US2015/054306.
PCT International Preliminary Report on Patentability and Written Opinion dated Apr. 20, 2017 issued in PCT/US2015/054290.
U.S. Office Action [Restriction Requirement] dated Jun. 12, 2017 issued in Design U.S. Appl. No. 29/504,989.
U.S. Office Action [Ex Parte Quayle] dated Aug. 24, 2017 issued in Design U.S. Appl. No. 29/504,989.
U.S. Notice of Allowance dated Dec. 22, 2017 issued in Design U.S. Appl. No. 29/504,989.
U.S. Office Action dated Jan. 23, 2018 issued in U.S. Appl. No. 14/876,203.

* cited by examiner

MOBILE CONNECTIVITY AND CONTROL OF SEMICONDUCTOR MANUFACTURING EQUIPMENT

CROSS-REFERENCE TO RELATED APPLICATIONS

This application claims priority to U.S. Provisional Patent Application No. 62/062,763 filed Oct. 10, 2014, titled MOBILE CONNECTIVITY AND CONTROL OF SEMICONDUCTOR MANUFACTURING EQUIPMENT, the disclosure of which is incorporated by reference herein in its entirety.

BACKGROUND

Currently, semiconductor tool maintenance operations are tracked through manual forms. Though data from the forms may be used to improve semiconductor tool maintenance, the forms may be lost and analyzing hand written feedback may be inaccurate, laborious, or impossible due to volume and timing constraints. There is also loss of productivity when paper forms are transcribed into electronic database systems. The format of data entry used may also vary operator to operator resulting in difficulty applying standardized method of analysis. Analyzing the forms filled out by technicians is time consuming and, when forms are lost, may not provide accurate data on how to improve semiconductor tool maintenance. Additionally, current semiconductor tools require users to control the tool, whether during processing or during maintenance, through an interface located on the semiconductor tool, increasing maintenance times and decreasing throughput.

SUMMARY

Semiconductor tool maintenance can be enhanced through the use of portable electronic devices specifically configured for that purpose. Integration of semiconductor tool maintenance operations on mobile devices enables technicians to more accurately perform semiconductor tool maintenance, and allows for more accurate collection and analysis of data so that maintenance procedures and resulting tool operation can be more repeatable, consistent and efficient. Additionally, current semiconductor tools require users to control the tool, whether during processing or during maintenance, through an interface located on the semiconductor tool. However, semiconductor tool maintenance often requires the maintaining technician to inspect and/or maintain items located all over the semiconductor tool and not just at the interface. Remote control of maintenance operations for the semiconductor tool via a portable electronic device decreases the time required to service semiconductor tools and thus increase throughput.

According to one implementation, a method for conducting semiconductor tool maintenance involves tethering a portable electronic device to a semiconductor processing tool. The portable electronic device is connected to the semiconductor tool such that data may be transferred between the semiconductor tool and the portable electronic device. Instructions for maintenance of the semiconductor processing tool are provided to the semiconductor processing tool via the portable electronic device, and the maintenance instructions are implemented on the semiconductor processing tool.

According to another implementation, a system for semiconductor tool maintenance includes a semiconductor tool, and a portable electronic device tethered to the semiconductor processing tool. The portable electronic device is communicatively coupled to the semiconductor tool so that data may be transferred between the semiconductor tool and the portable electronic device. The portable electronic device includes a display, a user input interface, and a processor communicatively coupled to the display, and the user input interface. The processor is configured to operate the portable electronic device for providing to the semiconductor processing tool via the portable electronic device instructions for maintenance of the semiconductor processing tool for implementation on the semiconductor processing tool.

In various implementations, the portable electronic device is a tablet, and the tethering is via a hardwired or wireless connection.

In some implementations the semiconductor tool may send telemetry data, for example relating to performance of the semiconductor tool or progress of a maintenance operation, to the portable electronic device.

In some implementations, the portable electronic device comprises a user interface for semiconductor tool selection and control.

In some implementations, the providing and implementing operations involve: determining, via the portable electronic device, that a user is performing at least one action associated with maintenance on a semiconductor tool, wherein the maintenance includes at least a first task and a second task. A time spent on the maintenance is tracked with the portable electronic device, wherein the time spent on the maintenance includes at least a time spent on the first task and a time spent on the second task. It is determined, with the portable electronic device, that the user is performing at least one action associated with the first task, and responsive to that determination, instructions associated with the first task are provided to the user via the portable electronic device. Also, responsive to that determination, the time spent on the first task is tracked with the portable electronic device. It is further determined, with the portable electronic device, that the user is performing at least one action associated with the second task, and responsive to that determination, instructions associated with the second task are provided to the user via the portable electronic device. Also, responsive to that determination, the time spent on the second task is tracked with the portable electronic device. The time spent on the maintenance of the semiconductor tool, including the time spent on the first task and the time spent on the second task, is then output from the portable electronic device to an associated computing device.

These and other implementations and details are set forth in the accompanying drawings and the description below.

DETAILED DESCRIPTION

Figure 1:
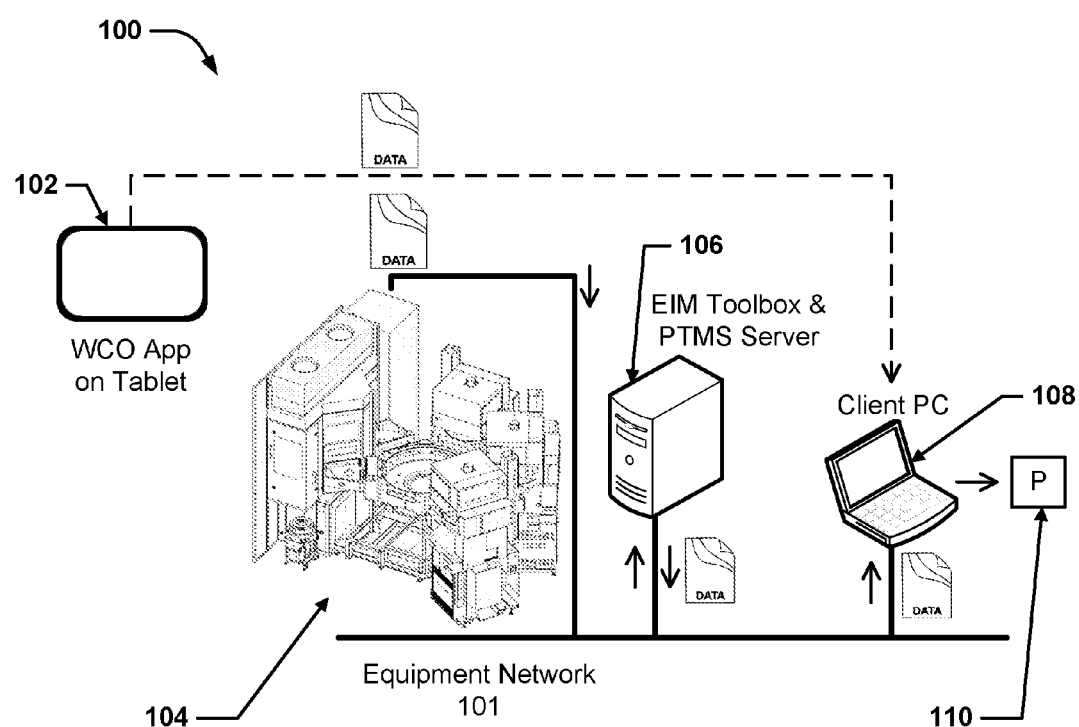
FIG. 1 shows an example semiconductor system with a mobile device for supporting service, maintenance, and tracking activities.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale unless specifically indicated as being scaled drawings.

It is to be understood that, as used herein, the term "semiconductor wafer" may refer both to wafers that are made of a semiconductor material, e.g., silicon, and wafers that are made of materials that are not generally identified as semiconductors, e.g., epoxy, but that typically have semiconductor materials deposited on them during a semiconductor processing. The apparatuses and methods described in this disclosure may be used in the processing of semiconductor wafers of multiple sizes, including 200-mm, 300 mm, and 450 mm diameter semiconductor wafers.

Wafer uniformity is an important factor in the processing of high quality semiconductor wafers or substrates. A factor in wafer uniformity is the condition of the semiconductor tool. Regular semiconductor tool maintenance is a factor in ensuring that semiconductor tools are in condition to minimize variation between processed semiconductor wafers. In addition, lack of defects is also an important feature of processed semiconductor wafers. Regular semiconductor tool maintenance is also a factor in minimizing defects on semiconductor wafers.

Wafer throughput is an additional factor in the processing of semiconductor wafers. Minimizing semiconductor tool maintenance times may increase wafer throughput by reducing the downtime that the semiconductor tool is unavailable to process semiconductor wafers. Additionally, consistent maintenance techniques allow semiconductor fabrication facilities to more accurately predict the downtime due to maintenance and thus more accurately plan the operations of the semiconductor tools. Accordingly, repeatable, consistent, and efficient semiconductor tool maintenance may improve both the quality and throughput of semiconductor wafer processing.

Currently, semiconductor tool maintenance operations are tracked through pencil and paper forms. Maintenance technicians perform the maintenance operations and note details of the maintenance operations on forms. Maintenance may be tracked through multiple forms. Though data from the forms may be used to improve semiconductor tool maintenance, the forms may be lost and analyzing hand written feedback may be inaccurate and/or laborious. Analyzing the forms filled out by technicians is time consuming and, when forms are lost, may not provide accurate data on how to improve semiconductor tool maintenance. The present inventors have realized that integration of semiconductor tool maintenance operations on mobile devices will allow technicians to more accurately perform semiconductor tool maintenance and allow more accurate analysis of data to improve maintenance to be more repeatable, consistent, and efficient.

Additionally, current semiconductor tools require users to control the tool, whether during processing or during maintenance, through an interface located on the semiconductor tool. For example, users are required to manually open the door of the semiconductor processing chamber. The pipes of the semiconductor tool are also shut off either manually or through an interface located on the semiconductor processing tool. Semiconductor tools are depressurized via the interface. However, semiconductor tool maintenance often requires the maintaining technician to inspect and/or maintain items located all over the semiconductor tool and not just at the interface. The present inventors have realized that allowing remote control of the semiconductor tool may decrease the time required to service semiconductor tools and thus increase throughput.

FIG. 1 shows an example semiconductor system with a mobile device for supporting service, maintenance, and tracking activities. System 100 includes a portable electronic device, such as a tablet 102, a semiconductor tool 104, a server 106, and a client computer 108. The client computer 108 may output a report 110.

In system 100, the semiconductor tool 104 may be connected to the tablet 102, the server 106, and/or the client computer 108 in an equipment network 101. The semiconductor tool 104 may be connected via network connections such as hardline connections, wireless connections such as WiFi, Bluetooth, 4G, etc., or through a combination of the hardline connections and the wireless connections. The components of the system 100 may all be located within the general vicinity of each other, but may also be located in different locations, such as in different buildings or even different areas of the country, and connected only via a network location. When the tablet 102 or another portable electronic device is connected to the semiconductor tool 104, the tablet 102 may be said to be "tethered" to the semiconductor tool 104. Data may be transferred between the semiconductor tool 104 and the tablet 102, the server 106, and/or the client computer 108 via the connections. The data transferred may include instructions on how to perform semiconductor tool maintenance, data on time spent on semiconductor tool maintenance and maintenance tasks, information on delays and issues, instructions to control the semiconductor tool, telemetry data, and other information associated with semiconductor tool maintenance and operation.

The equipment network 101 may include any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Devices 102, 104, 106 and 108 may be capable of connecting to network 101, interacting with the great diversity of sites, networks, and systems interconnected by or integrated with network 101, and downloading and executing applications and apps in ways that result in the presentation of user interfaces on client devices 102 and 108. Such devices include, but are not limited to, mobile devices (e.g., cell phones, smart phones, smart watches, tablets, etc.) and personal computers (e.g., laptops and desktops).

User interfaces may be presented on client devices 102 and 108 according to the techniques described herein in a variety of ways. For example, a user interface (UI) layout may be stored in the layout description language on the client device for presentation when called during execution of the corresponding app. Alternatively, a UI layout may be transmitted in the layout description language to the client device for presentation in response to a call from the app to a remote platform. And once a native view of a particular UI layout has been created, it may be saved locally on the client device for presentation with the same or different data bound to the view. The UI layout and/or the data bound to the UI layout for a given app may originate from a variety of sources. For example, both the UI layout and the bound data may be resident in memory on the client device as part of or in association with the app. Alternatively, the UI layout may be resident on the client device while the bound data may be transmitted from a remote platform (e.g., server 106) for presentation in conjunction with the UI layout in response to calls from the app or the layout engine.

In certain implementations, the tablet 102 may be another type of portable electronic device. Mobile phones, laptop computers, smart phones, smart watches, Google Glass and other wearable technology, and other pieces of equipment used in semiconductor, LED, and display technology manufacturing are examples of other types of suitable portable electronic devices.

In the implementation shown in FIG. 1, the semiconductor tool 104, the server 106, and the computer 108 are connected via hard connections while the tablet 102 is connected to the computer 108 via a wireless connection. In other implementations, the tablet may also be connected to the semiconductor tool and/or the server via a hardwired connection. Various other implementations may include different configurations of connectivity between the parts of the system. The network connections of the various other implementations may be either through hardline or through wireless connections.

It should also be noted that, despite references to particular computing paradigms and software tools herein, the logic and/or computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, any references to particular protocols herein are merely by way of example. Suitable alternatives known to those of skill in the art for all of these variations may be employed.

A portable electronic device/tablet 102 in accordance with this disclosure may be communicatively coupled with the semiconductor tool 104 and frequently the server device 106. The portable electronic device will have a display, a user input interface, and a processor communicatively coupled to the display, and the user input interface. As further described below, the processor is configured to operate the tablet 102 to control the semiconductor tool 104 during maintenance and operation of the semiconductor tool. According to one implementation, a method for conducting semiconductor tool maintenance involves tethering a portable electronic device to a semiconductor processing tool. The portable electronic device is connected to the semiconductor tool such that data may be transferred between the semiconductor tool and the portable electronic device. Instructions for maintenance of the semiconductor processing tool are provided to the semiconductor processing tool via the portable electronic device, and the maintenance instructions are implemented on the semiconductor processing tool.

According to another implementation, a system for semiconductor tool maintenance includes a semiconductor tool, and a portable electronic device tethered to the semiconductor processing tool. The portable electronic device is communicatively coupled to the semiconductor tool so that data may be transferred between the semiconductor tool and the portable electronic device. The portable electronic device includes a display, a user input interface, and a processor communicatively coupled to the display, and the user input interface. The processor is configured to operate the portable electronic device for providing to the semiconductor processing tool via the portable electronic device instructions for maintenance of the semiconductor processing tool for implementation on the semiconductor processing tool.

In various implementations, the portable electronic device is a tablet, and the tethering is via a hardwired or wireless connection. In some implementations the semiconductor tool may send telemetry data, for example relating to performance of the semiconductor tool or progress of a maintenance operation, to the portable electronic device. In some implementations, the portable electronic device comprises a user interface for semiconductor tool selection and control.

In some implementations, the providing and implementing operations involve: determining, via the portable electronic device, that a user is performing at least one action associated with maintenance on a semiconductor tool, wherein the maintenance includes at least a first task and a second task. A time spent on the maintenance is tracked with the portable electronic device, wherein the time spent on the maintenance includes at least a time spent on the first task and a time spent on the second task. It is determined, with the portable electronic device, that the user is performing at least one action associated with the first task, and responsive to that determination, instructions associated with the first task are provided to the user via the portable electronic device. Also, responsive to that determination, the time spent on the first task is tracked with the portable electronic device. It is further determined, with the portable electronic device, that the user is performing at least one action associated with the second task, and responsive to that determination, instructions associated with the second task are provided to the user via the portable electronic device. Also, responsive to that determination, the time spent on the second task is tracked with the portable electronic device. The time spent on the maintenance of the semiconductor tool, including the time spent on the first task and the time spent on the second task, is then output from the portable electronic device to an associated computing device.

Figure 2:
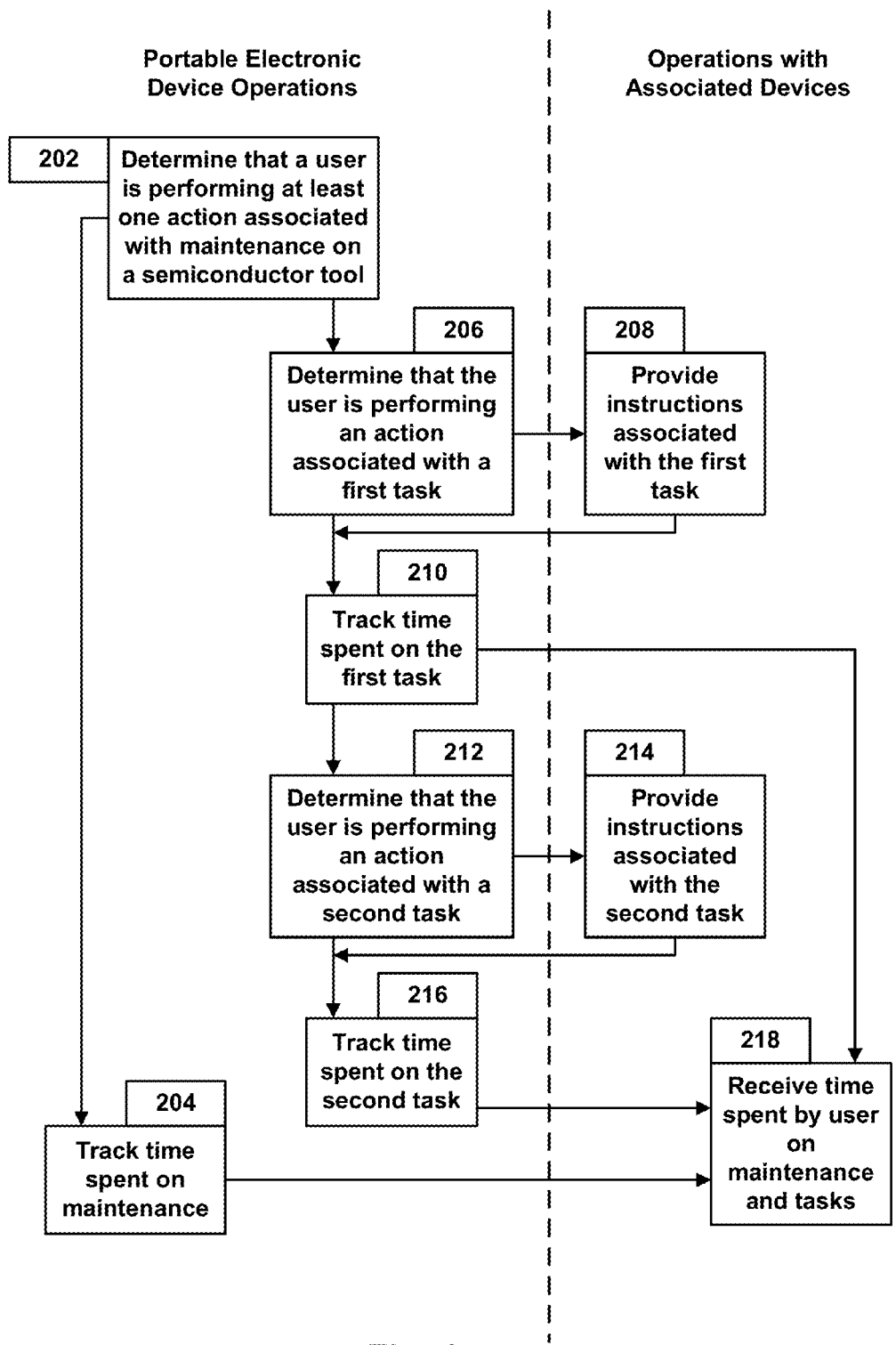
FIG. 2 shows a flow diagram detailing an example of supporting semiconductor tool maintenance and tracking activities with the mobile device.

FIG. 2 shows a flow diagram detailing an example of supporting semiconductor tool maintenance and tracking activities with the mobile device. FIG. 2 is separated into actions performed by the portable electronic device and actions performed by other devices associated with the portable electronic device. The portable electronic device in FIG. 2 may be a tablet, such as the tablet 102 in FIG. 1, or it may be another type of portable electronic device such as a smartphone or laptop computer. The associated devices in FIG. 2 may be a semiconductor tool, a server, a computer, other robotic devices, etc.

In block 202, the user interacts with the portable electronic device in a way that indicates the user is performing or is about to perform maintenance on a semiconductor tool. Example user interactions with the portable electronic device that may indicate that the user is performing or is about to perform maintenance on the semiconductor tool may include starting a program, such as an app, associated with semiconductor tool maintenance, connecting the portable electronic device to the semiconductor tool, accessing semiconductor tool maintenance instructions, or downloading instructions associated with semiconductor tool maintenance.

Semiconductor tool maintenance may be divided into tasks and subtasks. Each task may be a specific item, such as "open the semiconductor chamber door" or it may be a task such as "clean out semiconductor processing chamber" that includes a collection of subtasks such as "open the semiconductor chamber door" and "remove build-up in chamber."

In block 204, the time spent by the user on semiconductor tool maintenance is tracked after the determination is made that the user is performing semiconductor tool maintenance. In block 204, the time spent on semiconductor tool maintenance may be a total time that includes time spent resolving issues and on break or it may be a total time that only includes time spent on performing actual semiconductor tool maintenance.

Block 204 may also output the time spent on semiconductor tool maintenance to the associated device, such as the semiconductor tool, the server, or the computer, in block 218. In certain implementations, the time spent on the semiconductor tool maintenance may be total time spent and may only be outputted after the entire semiconductor tool maintenance has finished. In other implementations, the time spent on the semiconductor tool maintenance may be sent to the associated device or devices during periodic intervals or may be continuously sent to the associated device or devices.

In block 206, a determination is made that the user is performing a first task associated with the semiconductor tool maintenance. The determination may be made by, for example, the user selecting a first task on an app or program associated with semiconductor tool maintenance on the portable device, through interactions with the portable device indicating that he wishes to view instructions for the first task, or through other ways of detecting that the user is performing the first task.

In block 208, once a determination is made that the user is performing the first task, an associated device may provide instructions associated with the first task to the portable device for the first task. The associated device storing the instructions may be the semiconductor tool, a server, or a computer. In certain other implementations, the instructions may be stored on the portable device itself. The instructions may be provided to the portable device over network connections. Once the portable device receives the instructions, the instructions may be displayed by the portable device. The instructions may be written instructions, audible instructions, video instructions, illustrative drawings, other visual instructions, or instructions in a combination of mediums.

In certain implementations, the instructions may be combined with other functionalities. For example, during instructions, the user may be presented with the option of controlling certain functions of the semiconductor tool from the portable device. Accordingly, when the instructions are for preparing the semiconductor tool for maintenance, the user may be presented with the option of shutting off the line that contains precursor to the semiconductor tool from an interface on the portable device. Such options would save the user time by not requiring the user to close the valves manually, as closing the valves manually may require the user to walk around the semiconductor tool or access hard to access areas. Additionally, if the portable device includes a camera, the camera may be used to help the user find the location of certain items that the user may need to adjust.

In block 210, the time spent by the user on the first task is tracked after the determination is made that the user is performing the first task. In block 210, the time spent on the first task may include the time spent on all subtasks associated with the first task as well. The time spent may be a total time that includes time spent resolving issues and on break or it may be a total time that only includes time spent on performing the first task. In certain implementations, the time spent on subtasks of the first task may be individually tracked.

Block 210 may also output the time spent on the first task to the associated device in block 218. In certain implementations, the time spent on the first task may only be outputted after the first task has finished. In other implementations, the time spent on the first task may be sent to the associated device or devices during periodic intervals or may be continuously sent to the associated device or devices.

In block 212, a determination is made that the user is performing a second task associated with the semiconductor tool maintenance. The determination may be made in the same manner as the determination made that the user is performing the first task in block 206. In certain implementations, the second task may be performed after the first task has finished. Other implementations may allow the second task to be performed concurrent with the first task. Such a situation may be possible if, for example, performance of the first task is not a prerequisite to starting the second task. Thus, a technician may switch between the first task and the second task. In fact, in such an implementation, the second task may be performed before the first task.

In block 214, an associated device may provide instructions associated with the second task to the portable device for the second task after a determination is made that the user is performing the second task, similar to that in block 208.

In block 216, the time spent by the user on the second task is tracked after the determination is made that the user is performing the second task, similar to that in block 210. The time spent on the second task may also be outputted, as in block 218. The time spent on the second task may be outputted in a similar manner to that of the time spent on the first task and the second task may also include subtasks.

The time data that is outputted may be analyzed to improve semiconductor tool maintenance instructions and techniques. Automatic time tracking ensures that the data for time spent on maintenance is accurate. Automatic outputting of the time tracked ensures that all or substantially all of the time data reaches servers for analysis, therefore ensuring that the conclusions reached by analyzing the time data are accurate.

Figure 3:
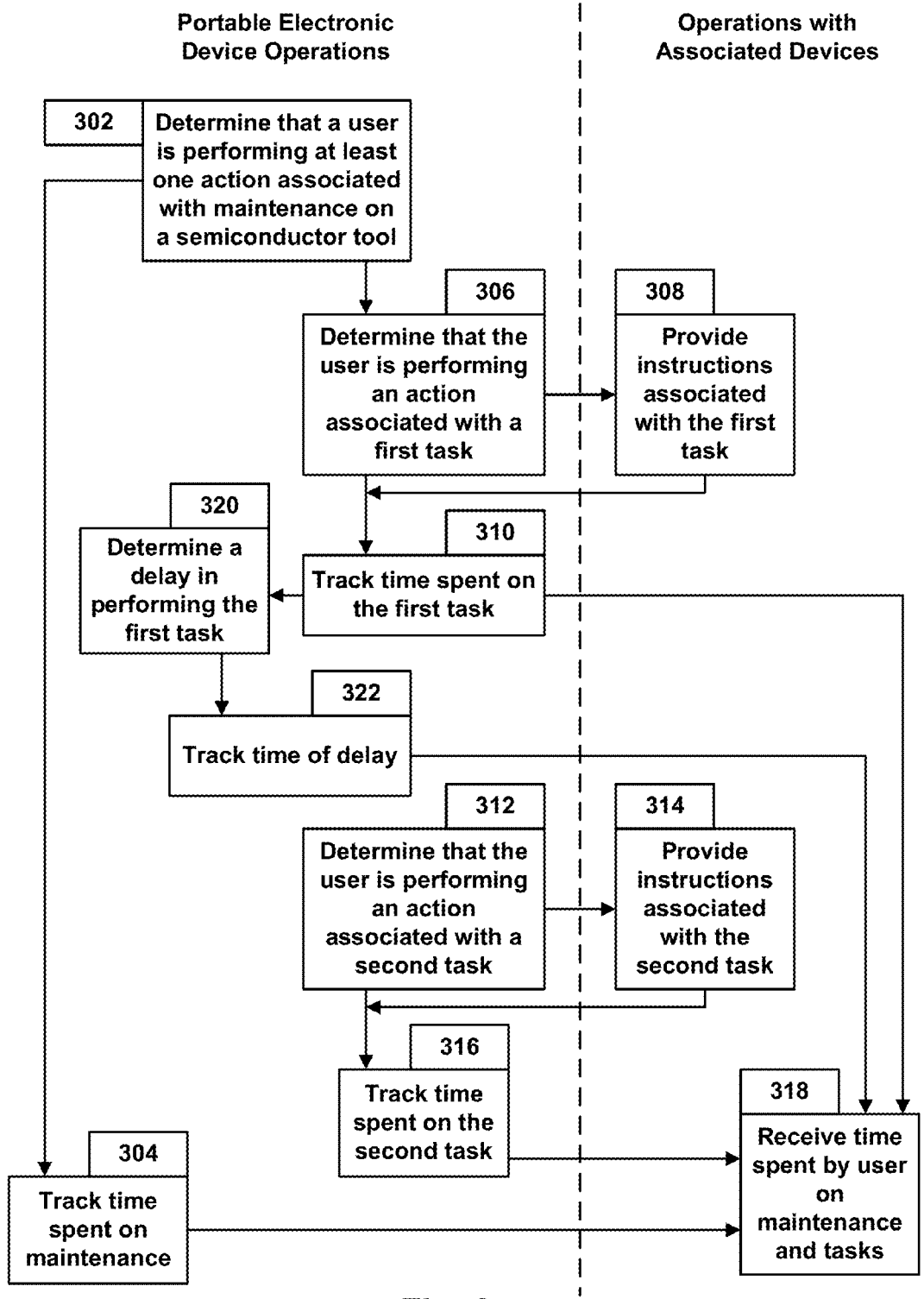
FIG. 3 shows a flow diagram detailing another example of supporting semiconductor tool maintenance and tracking activities with the mobile device.

FIG. 3 shows a flow diagram detailing another example of supporting semiconductor tool maintenance and tracking activities with the mobile device. Blocks 302-18 of FIG. 3 are similar to blocks 202-18, respectively, of FIG. 2. The descriptions given for blocks 202-18 are also applicable to blocks 302-18.

FIG. 3 includes blocks 320 and 322. Blocks 320 and 322 represent an example delay during the semiconductor tool maintenance. In block 320, a determination is made that there is a delay in the performance of the first task. The determination of the delay may be made by the portable device or associated device by, for example, having the user hit a pause button, by detecting that the user has not performed certain actions associated with the semiconductor tool maintenance, possibly by a threshold time frame, by the pausing of instructions, by deviating from the semiconductor tool maintenance procedure, or by other ways of determining that there is a delay After a delay is determined in block 320, the time of the delay is tracked in block 322. The time of the delay may be the time from when the delay is first detected, as outlined in block 320, to when the delay is determined to have finished. The delay may be determined to have finished by, for example, the user interacting with the portable device or the associated device in such a way as to indicate that the delay has finished, by the user hitting an un-pause button, by the user interacting again with the secondary device, the associated device, or the semiconductor tool, or by detecting that the user has resolved the delay.

A user may experience multiple delays during semiconductor tool maintenance. Various implementations may individually track the time spent on individual delays, may track a total time spent on the individual delays, or may track both the individual time spent on the various individual delays as well as the total time spent on the delays. The time or times spent on delays may then be outputted to the associated device in block 318.

The information on delays may be analyzed after the information has been outputted. For example, trends or patterns in the delay may be identified to determine common areas where delays happen. Such patterns may indicate certain changes to be made to the semiconductor tool maintenance procedure to, for example, improve the procedure to be more efficient or repeatable. Additionally, data indicating many delays without patterns may indicate that there may be a fundamental flaw in how maintenance instructions are presented. Other conclusions may be possible from analyzing the time data and the delay data provided.

Figure 4:
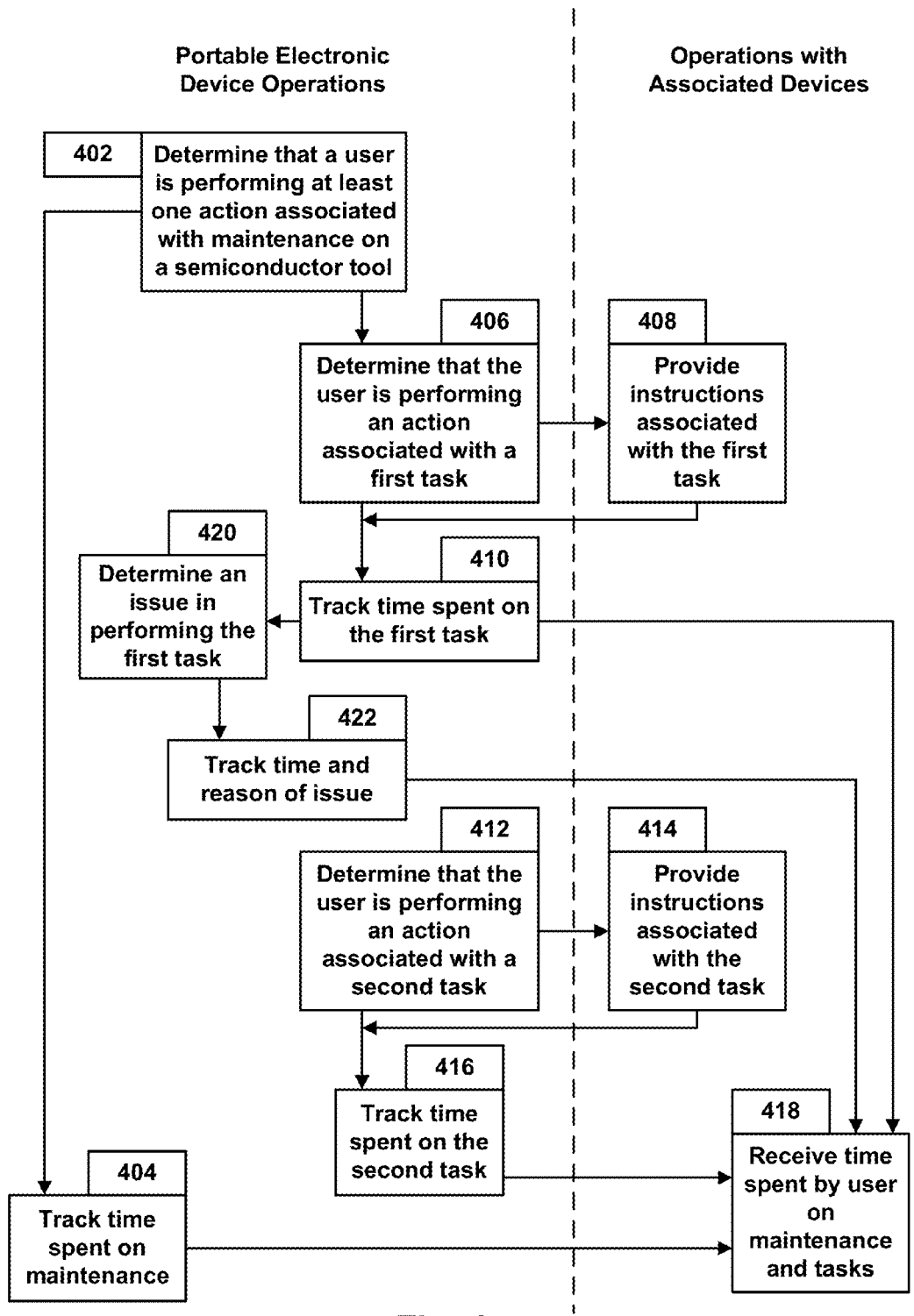
FIG. 4 shows a flow diagram detailing a further example of supporting semiconductor tool maintenance and tracking activities with the mobile device.

FIG. 4 shows a flow diagram detailing a further example of supporting semiconductor tool maintenance and tracking activities with the mobile device. Blocks 402-18 of FIG. 4 are similar to blocks 202-18, respectively, of FIG. 2. The descriptions given for blocks 202-18 are also applicable to blocks 402-18.

FIG. 4 includes blocks 420 and 422. Blocks 420 and 422 represent an example issue experienced during the semiconductor tool maintenance. In block 420, a determination is made that there is an issue during the performance of the first task. The determination of the issue may be made by the portable device or associated device by, for example, having the user hit an issue button, by detecting that the user has not performed certain actions associated with the semiconductor tool maintenance, possibly by a threshold time frame, by the pausing of instructions, by deviating from the semiconductor tool maintenance procedure, by determining that the user has performed at least part of the first task incorrectly, or by other ways of determining that there is an issue.

After an issue is determined in block 420, the time to resolve the issue is tracked in block 422. The time to resolve the issue may be the time from when the issue is first detected, as outlined in block 420, to when the issue is determined to have been resolved. The issue may be determined to have been resolved by, for example, the user interacting with the portable device or the associated device in such a way as to indicate that the issue has been resolved, by the user hitting an issues finished button, by detecting that the user is now correctly performing the steps of semiconductor tool maintenance, or by detecting that the user has resolved the issue in various other ways.

Additionally, the reason for the issue may be tracked in block 420 by, for example, having the user provide an account of the issue and/or an explanation of how the issue was resolved. The user may provide the account and/or explanation by provide information into a user interface on the mobile device and/or the associated device. The user may provide the information through typing, verbally, or through other means.

A user may experience multiple issues during semiconductor tool maintenance. Various implementations may individually track the time spent on individual issues, may track a total time spent on the individual issues, or may track both the individual time spent on the various individual issues as well as the total time spent on the issues. The time or times spent on the issues may then be outputted to the associated device in block 418.

The data concerning the issues experienced by the user as well as the user's feedback may be analyzed to further improve the semiconductor tool maintenance procedure. For example, patterns in issues encountered may be identified and the root causes of the pattern may be determined. The semiconductor tool maintenance procedure may then be modified to eliminate the root causes of the issues. The feedback of the user may also be taken into account when determining how to improve the semiconductor tool maintenance procedure. Other ways of improving the semiconductor tool maintenance procedure through analyzing the issues encountered by the users may also be used.

Figure 5:
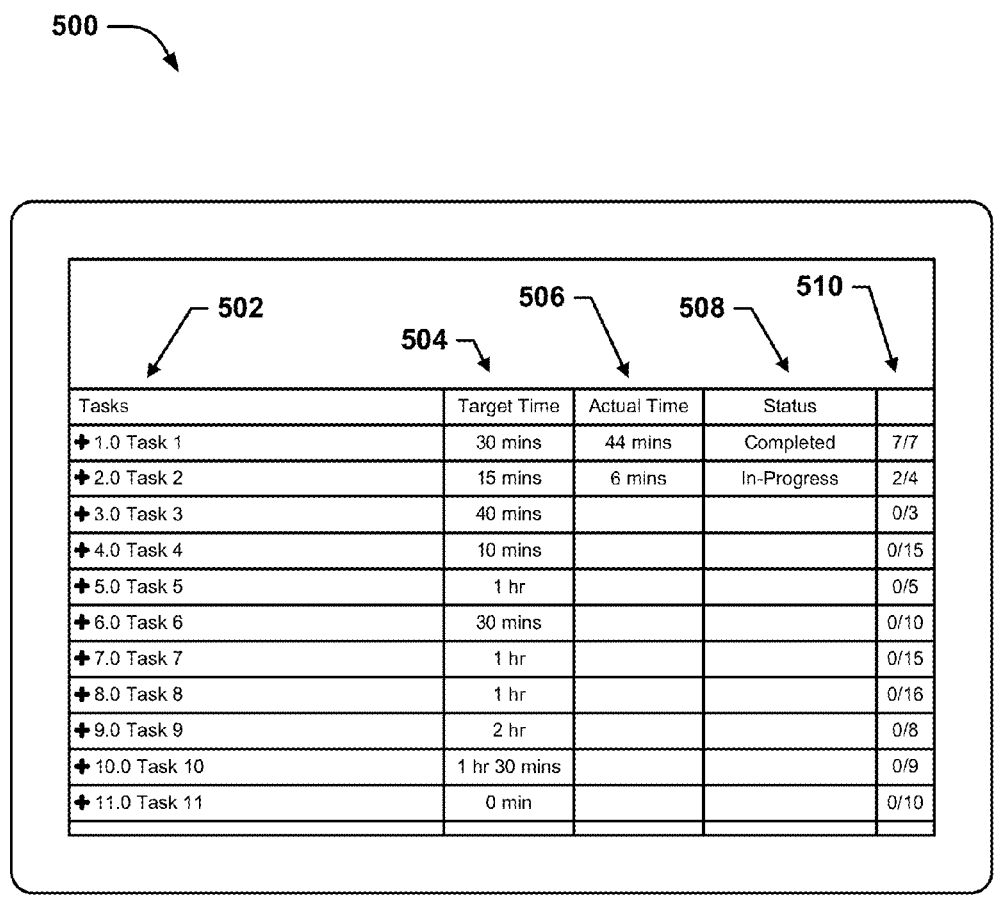
FIG. 5 shows an example mobile device interface for supporting semiconductor tool maintenance and tracking activities.

FIG. 5 shows an example mobile device interface for supporting semiconductor tool maintenance and tracking activities. The interface 500 in FIG. 5 is an example interface for tracking time spent on semiconductor tool maintenance. The interface 500 may be presented on portable electronic devices such as smartphones and tablets.

The interface 500 shows a task column 502, a target time column 504, a time tracking column 506, a status column 508, and a step completion column 510.

The interface 500 shows a semiconductor tool maintenance procedure with multiple tasks. Each task may include multiple subtasks. The task column 502 shows 11 tasks. Each task in the task column includes a "+" sign. In the implementation shown, clicking on the "+" sign of the task may expand the task to show the corresponding subtasks.

The target time column 504 shows a target time for the various tasks. The target time may be an estimated time that a normally skilled technician can complete the task in. The target time may allow a technician performing the semiconductor tool maintenance to judge her performance in carrying out her tasks. The target time may also be displayed for the entire semiconductor tool maintenance or for subtasks.

The time tracking column 506 may display the time spent on a task or subtask. The time spent may increment if the task is currently being performed. The time spent may be displayed only for the task being performed, may be displayed for tasks that are being performed or have been worked on, may be displayed for all tasks and subtasks shown on the interface 500.

The status column 508 shows the status of the task or subtask. Statuses that may be displayed include statuses such as "Not Started," "In-Progress," "Paused," "Issue," "Completed," etc.

The step completion column 510 shows how many subtasks are under each task and also how many subtasks have been completed. The number on the right side shows the number of subtasks while the number on the left side shows the number of subtasks completed.

Figure 6:
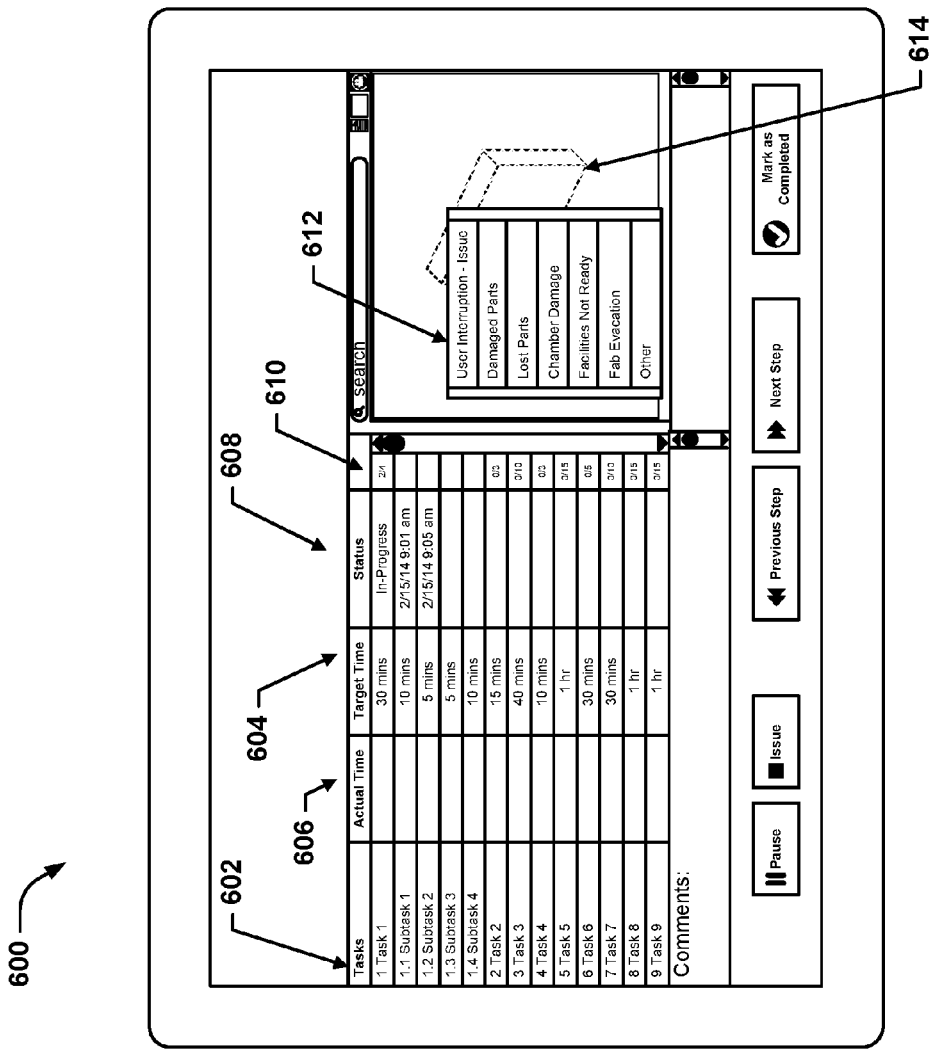
FIG. 6 shows a further example mobile device interface with a delay pop-up screen, for supporting semiconductor tool maintenance and tracking activities.

FIG. 6 shows a further example mobile device interface with a delay pop-up screen, for supporting semiconductor tool maintenance and tracking activities. The interface 600 is a further example interface for tracking time spent on semiconductor tool maintenance.

The interface 600 shows a task column 602, a target time column 604, a time tracking column 606, a status column 608, a step completion column 610, a pop-up screen 612, and a video instruction window 614. The task column 602, the target time column 604, the time tracking column 606, the status column 608, and the step completion column 610 are similar to their respective columns 502-10 in FIG. 5. The disclosure applicable to columns 502-10 are thus also applicable to columns 602-10.

The pop-up screen 612 allows a user to select a reason for a delay. In the implementation shown, the pop-up screen 612 offers selections of "User Interruption—Issue," "Damaged Parts," "Lost Parts," "Chamber Damage," "Facilities Not Ready," "Fab Evacuation," and "Other" as reasons for the delay. Other implementations may include other choices for delay reasons. Once a delay reason is selected, a further window may allow the user to provide further detail as to the reason for the delay.

The video instruction window 614, partially obscured by the pop-up screen 612 in FIG. 6, may display video instructions for the various tasks and subtasks of the semiconductor tool maintenance. The video instructions may be stored in the memory of the portable electronic device, or it may be downloaded from an associated device upon detection of the user performing the semiconductor tool maintenance or performing specific tasks.

Figure 7:
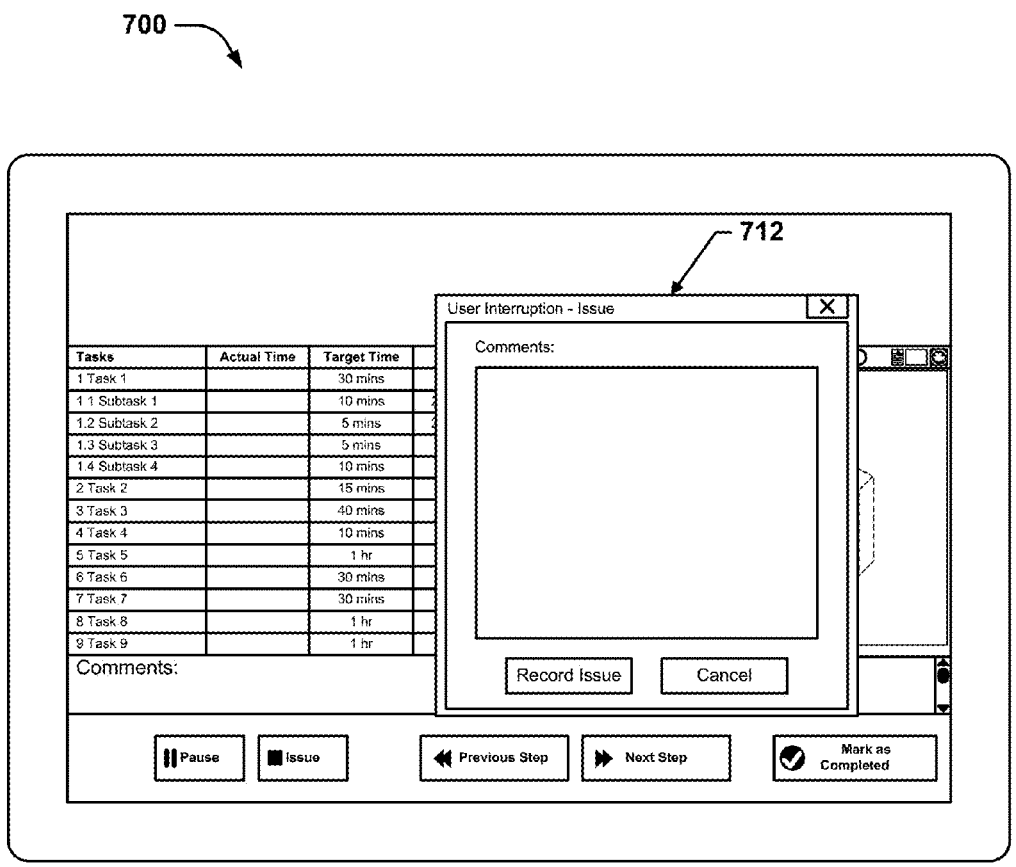
FIG. 7 shows the further example mobile device interface of FIG. 6 with an issue pop-up screen.

FIG. 7 shows the further example mobile device interface of FIG. 6 with an issue pop-up screen. The interface 700 shows a pop-up window 712. The pop-up window 712 may be displayed after the user selects a delay reason in a pop-up screen such as the pop-up screen 612 in FIG. 6. The user may then input a specific reason for the delay in pop-up window 712. The reason may then be sent to a server or computer for analysis as to how to improve the semiconductor tool maintenance process.

Figure 8:
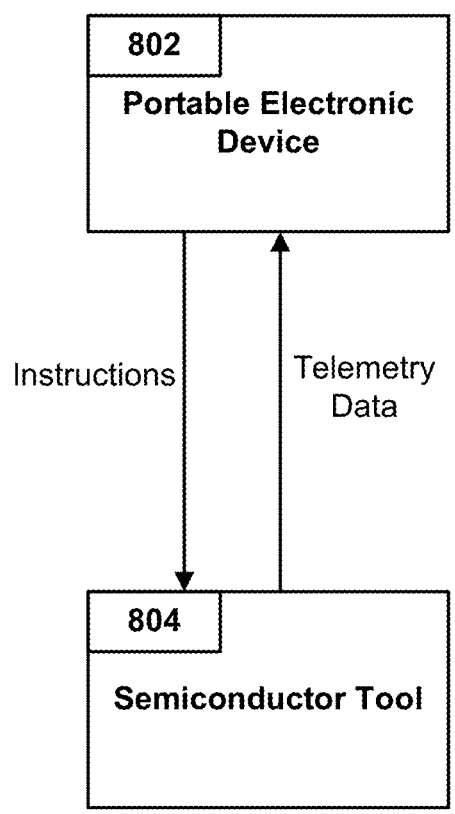
FIG. 8 shows a flow diagram detailing an example flow of information when a portable electronic device is tethered with a semiconductor tool.

FIG. 8 shows a flow diagram detailing an example flow of information when a portable electronic device is tethered with a semiconductor tool. The portable electronic device may be tethered to the semiconductor tool to control operations of the semiconductor tool. After tethering is achieved, a portable electronic device 802 may send command instructions to the semiconductor tool 804. The command instructions may include instructions to control the functions of the semiconductor tool 804, such as pressurizing the semiconductor chamber, shutting off the flow of precursor, powering up or powering down equipment, opening the chamber doors, etc.

Additionally, the semiconductor tool 804 may send telemetry data to the portable electronic device 802. Telemetry data may allow the user, a technician, or another device to track the performance of the semiconductor tool and/or the progress of a maintenance operation. Telemetry data may include data from the semiconductor tool itself, manually entered data stored within the semiconductor tool, performance data of the semiconductor tool or of the progress of the semiconductor tool maintenance. For example, data from a subsystem test like a chamber leak rate or gas calibration test, may be received and displayed by the portable electronic device (e.g., tablet) 802. This information may be used to determine pass/fail results for a next series of maintenance operations. The tablet can display maintenance tasks so that the user can see the pass/fail results of the subsystem test, as well as details of the result.

The telemetry data may be outputted via the portable electronic device 802 by being displayed, by being audibly communicated, or through other methods of communication. In certain implementations, the telemetry data may be communicated by the portable electronic device 802 to another electronic device, such as the server 106 and/or the computer 108 in FIG. 1.

In various implementations, one or multiple applications, such as apps or software programs, may handle the various aspects of controlling and receiving information from the semiconductor tool.

Figure 9:
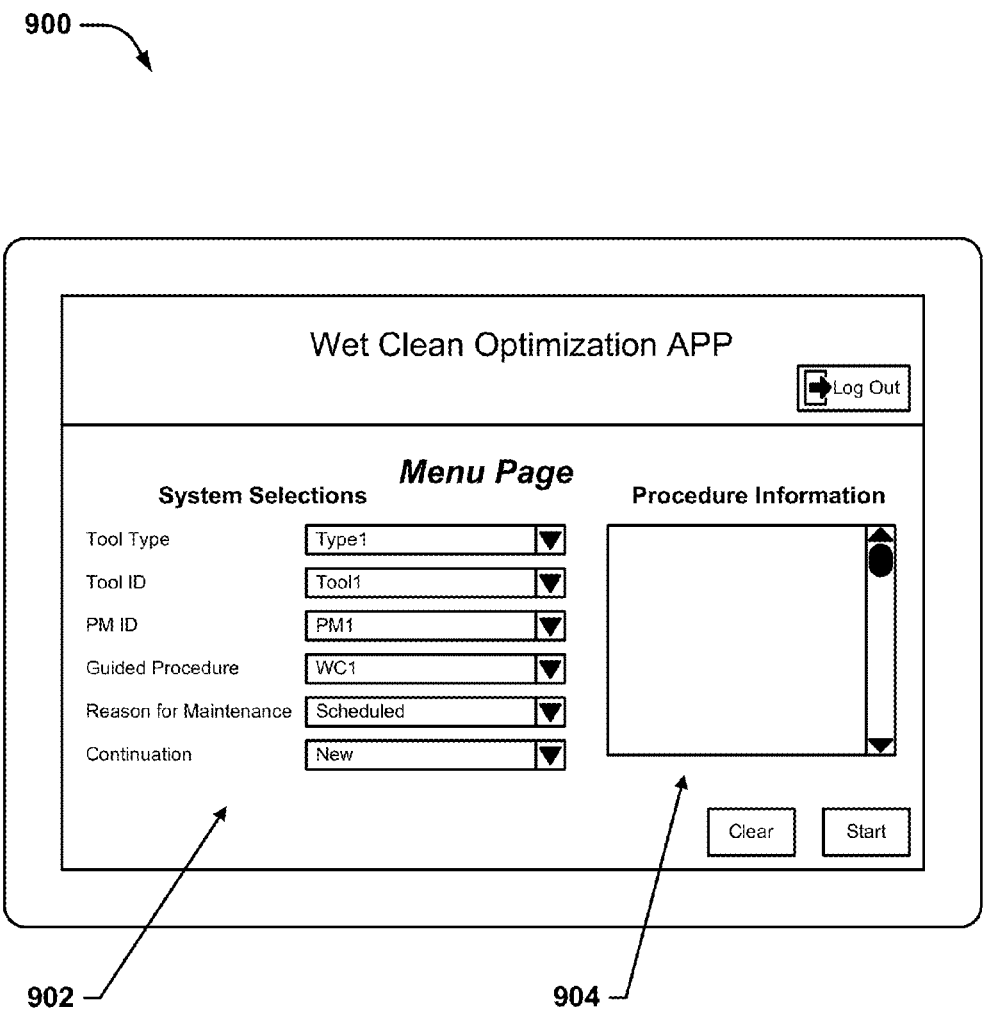
FIG. 9 shows an example mobile device interface with a semiconductor tool selection interface for tethering a portable electronic device to a semiconductor tool.

FIG. 9 shows an example mobile device interface with a semiconductor tool selection interface for tethering a portable electronic device to a semiconductor tool. The interface 900 is a menu page for selecting a semiconductor tool that a portable electronic device may tether to. The menu shown in interface 900 includes a semiconductor tool selection section 902 and a procedure information section 904.

The semiconductor tool selection section 902 allows the selection of the semiconductor tool that the portable electronic device will be tethered to. In the implementation shown, the semiconductor tool selection section 902 allows the user to select the tool type, the ID of the tool, the procedure being performed, the type of guidance required for the procedure (certain implementations may allow the guidance to be adjusted depending on the needs of the user), the reason for maintenance, and whether the operation is a continuation of a previous operation or a new operation. Other implementations may include other selections.

The procedure information section 904 may include a summary of the procedure currently selected. Other implementations of the procedure information sections may include other information.

The apparatus/process described hereinabove may be used in conjunction with lithographic patterning tools or processes, for example, for the fabrication or manufacture of semiconductor devices, displays, LEDs, photovoltaic panels and the like. Typically, though not necessarily, such tools/processes will be used or conducted together in a common fabrication facility. Lithographic patterning of a film typically comprises some or all of the following steps, each step enabled with a number of possible tools: (1) application of photoresist on a workpiece, i.e., substrate, using a spin-on or spray-on tool; (2) curing of photoresist using a hot plate or furnace or UV curing tool; (3) exposing the photoresist to visible or UV or x-ray light with a tool such as a wafer stepper; (4) developing the resist so as to selectively remove resist and thereby pattern it using a tool such as a wet bench; (5) transferring the resist pattern into an underlying film or workpiece by using a dry or plasma-assisted etching tool; and (6) removing the resist using a tool such as an RF or microwave plasma resist stripper.

It will also be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations can be selectively combined to provide one or more comprehensive, but slightly different, technical solutions. It will therefore be further appreciated that the above description has been given by way of example only and that modifications in detail may be made within the scope of the disclosure.

What is claimed:

1. A method for conducting semiconductor processing tool maintenance, the method comprising:
   tethering a portable electronic device to a semiconductor processing tool, whereby the portable electronic device is connected to the semiconductor processing tool so that data is transferrable between the semiconductor processing tool and the portable electronic device;
   providing to the semiconductor processing tool via the portable electronic device instructions for maintenance of the semiconductor processing tool; and
   implementing the maintenance instructions on the semiconductor processing tool;
   wherein the providing and implementing comprise:
   (a) determining, via the portable electronic device, that a user is performing at least one action associated with maintenance on the semiconductor processing tool, wherein the maintenance includes at least a first task and a second task;
   (b) tracking, with the portable electronic device, a time spent on the maintenance, wherein the time spent on the maintenance includes at least a time spent on the first task and a time spent on the second task;
   (c) determining, with the portable electronic device, that the user is performing at least one action associated with the first task;
   (d) providing, responsive to (c), instructions associated with the first task to the user via the portable electronic device;
   (e) tracking, responsive to (c) and with the portable electronic device, the time spent on the first task;
   (f) determining, with the portable electronic device, that the user is performing at least one action associated with the second task;
   (g) providing, responsive to (f), instructions associated with the second task to the user via the portable electronic device;
   (h) tracking, responsive to (f) and with the portable electronic device, the time spent on the second task; and
   (i) outputting the time spent on the maintenance of the semiconductor processing tool, the time spent on the first task, and the time spent on the second task from the portable electronic device to an associated computing device.

2. The method of claim 1, wherein the portable electronic device is a tablet.

3. The method of claim 1, wherein the tethering is via a wireless connection.

4. The method of claim 1, wherein the tethering is via a hardwired connection.

5. The method of claim 1, wherein the instructions for maintenance comprise instructions to control functions of the semiconductor processing tool selected from the group consisting of pressurizing a semiconductor processing chamber, shutting off precursor flow, powering up or powering down equipment, and opening the chamber doors.

6. The method of claim 1, further comprising the semiconductor processing tool sending telemetry data to the portable electronic device.

7. The method of claim 6, wherein the telemetry data relates to performance of the semiconductor processing tool or progress of a maintenance operation.

8. The method of claim 7, wherein the telemetry data is outputted via the portable electronic device by being displayed or by being audibly communicated.

9. The method of claim 8, further comprising communicating the telemetry data via the portable electronic device to another electronic device.

10. The method of claim 6, wherein the telemetry data comprises data on time spent on semiconductor processing tool maintenance tasks and information on delays and issues.

11. The method of claim 1, wherein the portable electronic device comprises a user interface for semiconductor processing tool selection and control.

12. A system for semiconductor processing tool maintenance, the system comprising:
    a semiconductor processing tool; and
    a portable electronic device tethered to the semiconductor processing tool, whereby the portable electronic device is communicatively coupled to the semiconductor processing tool so that data is transferrable between the semiconductor processing tool and the portable electronic device, the portable electronic device comprising a display, a user input interface, and a processor communicatively coupled to the display, and the user input interface, the processor configured to operate the portable electronic device for providing to the semiconductor processing tool via the portable electronic device instructions for maintenance of the semiconductor processing tool for implementation on the semiconductor processing tool;
    wherein the instructions for maintenance of the semiconductor processing tool comprise:
    (a) determining, via the portable electronic device, that a user is performing at least one action associated with maintenance on a semiconductor processing tool, wherein the maintenance includes at least a first task and a second task;
    (b) tracking, with the portable electronic device, a time spent on the maintenance, wherein the time spent on the maintenance includes at least a time spent on the first task and a time spent on the second task;
    (c) determining, with the portable electronic device, that the user is performing at least one action associated with the first task;
    (d) providing, responsive to (c), instructions associated with the first task to the user via the portable electronic device;
    (e) tracking, responsive to (c) and with the portable electronic device, the time spent on the first task;
    (f) determining, with the portable electronic device, that the user is performing at least one action associated with the second task;
    (g) providing, responsive to (f), instructions associated with the second task to the user via the portable electronic device;
    (h) tracking, responsive to (f) and with the portable electronic device, the time spent on the second task; and
    (i) outputting the time spent on the maintenance of the semiconductor processing tool, the time spent on the first task, and the time spent on the second task from the portable electronic device to an associated computing device.

13. The system of claim 12, further comprising a server device communicatively coupled with the portable electronic device.

14. The system of claim 12, wherein the portable electronic device is a tablet.

15. The system of claim 12, wherein the tethering is via a wireless connection.

16. The system of claim 12, wherein the instructions for maintenance comprise instructions to control functions of the semiconductor processing tool selected from the group consisting of pressurizing a semiconductor processing chamber, shutting off precursor flow, powering up or powering down equipment, and opening the chamber doors.

17. The system of claim 12, further comprising the semiconductor processing tool sending telemetry data to the portable electronic device.

18. The system of claim 12, wherein the portable electronic device comprises a user interface for semiconductor processing tool selection and control.

* * * * *